United States Patent
Shim et al.

(10) Patent No.: US 9,563,959 B2
(45) Date of Patent: Feb. 7, 2017

(54) IMAGE PROCESSOR, LIGHTING PROCESSOR AND METHOD THEREFOR

(75) Inventors: Hyun Jung Shim, Yongin (KR); Do Kyoon Kim, Yongin (KR); Tae Hyun Rhee, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 13/992,513

(22) PCT Filed: Dec. 9, 2011

(86) PCT No.: PCT/KR2011/009506
§ 371 (c)(1),
(2), (4) Date: Jun. 7, 2013

(87) PCT Pub. No.: WO2012/078006
PCT Pub. Date: Jun. 14, 2012

(65) Prior Publication Data
US 2013/0251243 A1    Sep. 26, 2013

Related U.S. Application Data

(60) Provisional application No. 61/421,354, filed on Dec. 9, 2010.

(30) Foreign Application Priority Data

Jan. 14, 2011    (KR) .................. 10-2011-0003885
Dec. 9, 2011     (KR) .................. 10-2011-0131598

(51) Int. Cl.
*G06T 7/00*    (2006.01)
*G06T 7/40*    (2006.01)
(Continued)

(52) U.S. Cl.
CPC ............. *G06T 7/0075* (2013.01); *G06T 5/007* (2013.01); *G06T 5/50* (2013.01); *G06T 7/40* (2013.01);
(Continued)

(58) Field of Classification Search
CPC ........ G06T 15/506; G06T 15/50; G06T 17/00; G06T 2200/08; G06T 15/60; G06T 15/80; G06T 7/0075; G06T 7/0081; G06T 7/40; G06T 5/007; G06T 5/50; G06K 9/4661; G01N 21/55; G03B 35/26; H04N 13/0239
(Continued)

(56) References Cited

U.S. PATENT DOCUMENTS 7,262,771 B2    8/2007 Snyder et al.
2010/0079618 A1*  4/2010 Sato ................. G06T 3/4053
                                                348/229.1
(Continued)

FOREIGN PATENT DOCUMENTS

CN    101972491 A    10/2010
JP    2001-14485     1/2001
(Continued)

OTHER PUBLICATIONS

International Search Report of PCT/KR2011/009506 mailed Jul. 18, 2012.
(Continued)

*Primary Examiner* — Vu Le
*Assistant Examiner* — Kenny Cese
(74) *Attorney, Agent, or Firm* — NSIP Law

(57) ABSTRACT

An image processor, a lighting processor, and a method therefore are provided. According to one aspect of the invention, the lighting processor can extract information related to defuse lighting applied to a real object using a colored image and a depth image of the real object. The
(Continued)

lighting processor can recover the diffuse image for the real object using the extracted information related to diffuse lighting, and generate either a speculum image or a shadow image using the recovered diffuse image and the colored image.

24 Claims, 13 Drawing Sheets

(51) Int. Cl.
*G06T 5/00* (2006.01)
*G06T 5/50* (2006.01)
*G06T 15/50* (2011.01)
*H04N 13/02* (2006.01)

(52) U.S. Cl.
CPC ... *G06T 15/506* (2013.01); *G06T 2207/10024* (2013.01); *G06T 2207/10028* (2013.01)

(58) Field of Classification Search
USPC ........................................................ 382/154
See application file for complete search history.

(56) References Cited

U.S. PATENT DOCUMENTS

| 2010/0283883 | A1* | 11/2010 | Sato | ..................... G02B 27/283 |
| | | | | 348/335 |
| 2010/0289878 | A1* | 11/2010 | Sato | ................... H04N 13/0239 |
| | | | | 348/46 |
| 2010/0303344 | A1* | 12/2010 | Sato | ..................... G06T 7/0081 |
| | | | | 382/162 |
| 2011/0164811 | A1* | 7/2011 | Ishiyama | ........... G06K 9/00241 |
| | | | | 382/154 |

FOREIGN PATENT DOCUMENTS

| JP | 2005-310188 | 11/2005 |
| KR | 2003-0076470 | 9/2003 |
| KR | 10-2006-0070174 | 6/2006 |
| KR | 10-2010-0053413 | 5/2010 |
| KR | 10-2010-0078353 | 7/2010 |

OTHER PUBLICATIONS

Sung-ho Lee et al. "Precomputed Radiance Transfer for Real-Time Rendering in Dynamic, Low-Frequency Lighting Environments", Apr. 3, 2006, pp. 1-25.

Jo Uk Rae, "Spherical Harmonics Irradiance" PRT-4 SHI, 25 pages.

Nishino, Ko, et al., "Light Sources and Reflectance from a Sparse Set of Images" Information Processing Society Journal of Japan, Corporation Information Processing Society, Apr. 15, 2003, vol. 44, SIG5 (CVIM6): 1-10.

Wang, Jun. "Illumination Model Based on Environment Mapping." Dissertation. Chinese Doctoral Dissertations & Master's Theses Full-text Database Information Science and Technology. Sep. 15, 2006: 22-44.

Japanese Office Action issued by the Japanese Patent Office on Apr. 14, 2015 in counterpart Japanese Application No. 2013543107 (5 pages in Japanese, with English abstract).

Chinese Office Action issued by the Chinese Patent Office on May 6, 2015 in counterpart corresponding Chinese Patent Application No. 201180059616.0 (28 pages in Chinese, with English translation).

* cited by examiner

<SPECULUM IMAGE BASED>

<SHADOW IMAGE BASED>

<SHADOW RAY DISTRIBUTION>

IMAGE PROCESSOR, LIGHTING PROCESSOR AND METHOD THEREFOR

CROSS-REFERENCE TO RELATED APPLICATIONS

This application is a U.S. National Stage application of PCT/KR2011/009506 filed Dec. 9, 2011 and claims the foreign priority benefit of Korean Application No. 10-2011-0003885 filed Jan. 14, 2011 and Korean Application No. 10-2011-0131598 filed Dec. 9, 2011 in the Korean Intellectual Property Office and U.S. Provisional Application No. 61/421,354 filed Dec. 9, 2010 in the U.S. Patent and Trademark Office, the contents of which are incorporated herein by reference.

TECHNICAL FIELD

Example embodiments relate to image processing to generate a lighting condition from an image, and to apply the generated lighting condition to a virtual object to be added in an image.

BACKGROUND ART

With developments of three-dimensional (3D) graphics technology and related to hardware technology, contents for expressing an object realistically are being produced in various application fields, such as a 3D game, a 3D movie, a smart-phone, and the like. Since a rendering technique may be employed to express an object realistically, the rendering technique may require an accurate modeling of a geometry, material properties, and lighting.

DISCLOSURE OF INVENTION

Technical Solutions

According to an aspect of the present invention, there is provided a lighting processor including a diffuse image extraction unit to extract, using a colored image and a depth image of a real object, diffuse lighting information applied to the real object, a diffuse image recovery unit to recover a diffuse image with respect to the real object, based on the extracted diffuse lighting information, and an error image separation unit to generate at least one of a speculum image and a shadow image, using the recovered diffuse image and the colored image.

Advantageous Effects

The example embodiments may provide a lighting processor and method that may achieve a lighting condition applied to a real object from a colored image and a depth image obtained by photographing the real object, without additionally utilizing an auxiliary apparatus.

The example embodiments may provide a lighting processor and method that may obtain a more realistic rendering result by applying, to a virtual object, a lighting condition achieved from an image when the virtual object is added to the image.

Figure 1:
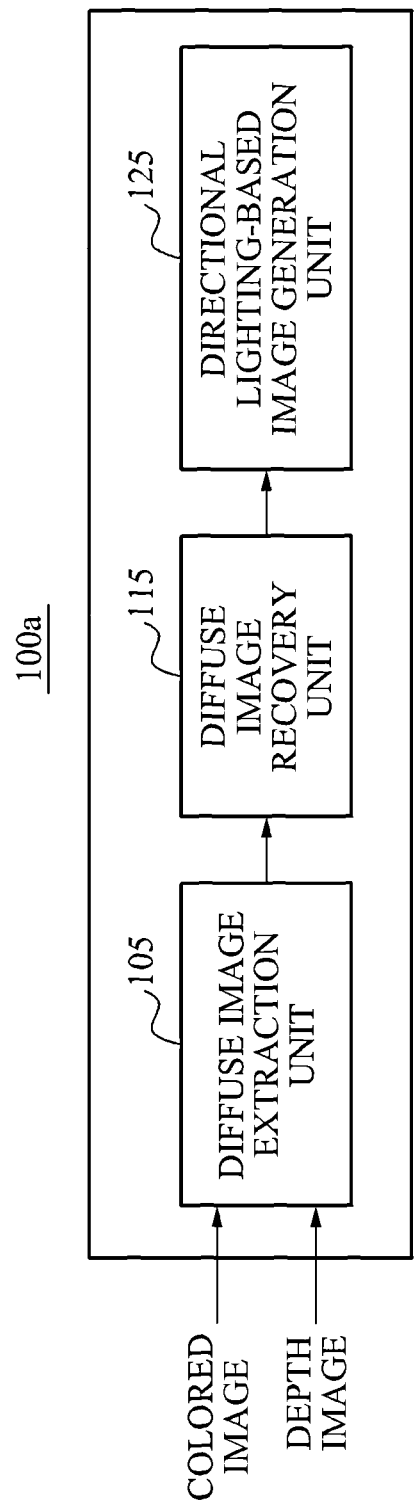
FIG. 1 is a block diagram illustrating a lighting processor according to example embodiments.

Additional aspects of embodiments will be set forth in part in the description which follows and, in part, will be apparent from the description, or may be learned by practice of the disclosure.

BEST MODE FOR CARRYING OUT THE INVENTION

Reference will now be made in detail to example embodiments, examples of which are illustrated in the accompanying drawings, wherein like reference numerals refer to the like elements throughout. Example embodiments are described below in order to explain example embodiments by referring to the figures.

A rendering technique for expressing an object realistically may require an accurate modeling of a geometry, material properties, and lighting. In a case of the geometry of the object, with developments of a depth camera for photographing a depth image, geometric information of a moving object may be obtained in real time. In a case of the material properties, varied experimental or physical model has been suggested, for example, a Lambertian scheme, a Phong scheme, a Cook-Torrance scheme, an Oren-Nayar scheme, an emperical bidirectional subsurface scattering to distribution function (BSSRDF) scheme, a bidirectional reflectance distribution function (BRDF) scheme, and the like.

In a case of the lighting, conventionally, a lighting model, that is, a lighting condition, applied to an object is extracted by an auxiliary apparatus, for example, a Lambertian object, chrome ball, and the like. Conversely, a lighting processor such as, a lighting processor 100a of FIG. 1, a lighting processor 100b of FIG. 1, and a lighting processor 200 of FIG. 3 may extract a lighting condition based on a colored image and a depth image of a real object without using an auxiliary apparatus. The lighting processors 100a, 100b, and 200 of FIGS. 1, 2, and 3 may be applied to consumer electronics (CE), for example, a digital camera, a mobile phone, a smart-phone, and the like. As used herein, the "lighting condition" may include "information on a direction of a lighting applied to a real object" and "information on an illuminance of a lighting applied to a real object".

The lighting condition generated by the lighting processor may include diffuse lighting information and directional lighting information. In particular, an original lighting condition may be recovered by combining the diffuse lighting information and the directional lighting information. Example embodiments of recovering the original lighting condition may be available by using either of the diffuse lighting information or the directional lighting information.

In view of a frequency domain, the diffuse lighting information may have a property corresponding to a low frequency component of the original lighting condition. In view of the frequency domain, the directional lighting information may have a property corresponding to a high frequency component of the original lighting condition. The diffuse lighting information may have a continuous form and the directional lighting information may have a discontinuous form, in the frequency domain.

A real object may reflect light. For example, a diffuse reflection having an omnidirectional reflection property or a specular reflection having a directional reflection property may occur on a surface of the real object. A diffuse image including pixels influenced by the diffuse reflection may be generated, or a speculum image including pixels influenced by the specular reflection may be generated, using a photographed image of a real object. Also, a shadow may occur on the real object and in surroundings of the real object based on a directional property of light, and a shadow image including pixels influenced by a shadow in an original image may be generated.

The diffuse lighting information may be obtained from the diffuse image. The directional lighting information may be extracted from at least one of the speculum image and the shadow image. Example embodiments of generating the diffuse image using the diffuse lighting information, or generating the speculum image or the shadow image using the directional lighting information may be possible.

According to the example embodiments, a lighting processor may extract diffuse lighting information using a colored image and a depth image of a real object. The lighting processor may generate a diffuse image using the extracted diffuse lighting information. Also, the lighting processor may generate a speculum image using the diffuse image and an original image. The lighting processor may extract directional lighting information from the generated speculum image. Further, the lighting processor may generate a shadow image using the diffuse image and the original image. The lighting processor may extract the directional lighting information from the generated shadow image.

The lighting processor may generate a lighting condition using the extracted lighting information and apply the generated lighting condition to a virtual object. More particularly, an image processor including the lighting processors 100a, 100b, and 200 of FIGS. 1, 2, and 3 may generate the lighting condition using an image including a predetermined scene, and insert, to the image including the predetermined scene, the virtual object to which the generated lighting condition is applied. For example, the image processor may extract the directional lighting information based on a depth image and a colored image, and compose a virtual object to which a lighting condition is applied based on the extracted directional lighting information to the colored image.

FIG. 1 is a block diagram illustrating a lighting processor 100a according to example embodiments.

Referring to FIG. 1, the lighting processor 100a may include a diffuse image extraction unit 105, a diffuse image recovery unit 115, and a directional lighting-based image generation unit 125.

The diffuse image extraction unit 105 may extract diffuse lighting information applied to a real object, based on a colored image and a depth image of the real object.

The diffuse image recovery unit 115 may recover a diffuse image based on the extracted diffuse lighting information. The diffuse lighting information may be stored in a form of a texture.

The directional lighting-based image generation unit 125 may generate a speculum image from an error image between the colored image and the diffuse image recovered by the diffuse image recovery unit 115. In this example, the directional lighting-based image generation unit 125 may generate a shadow image from the error image between the recovered diffuse image and the colored image.

Figure 2:
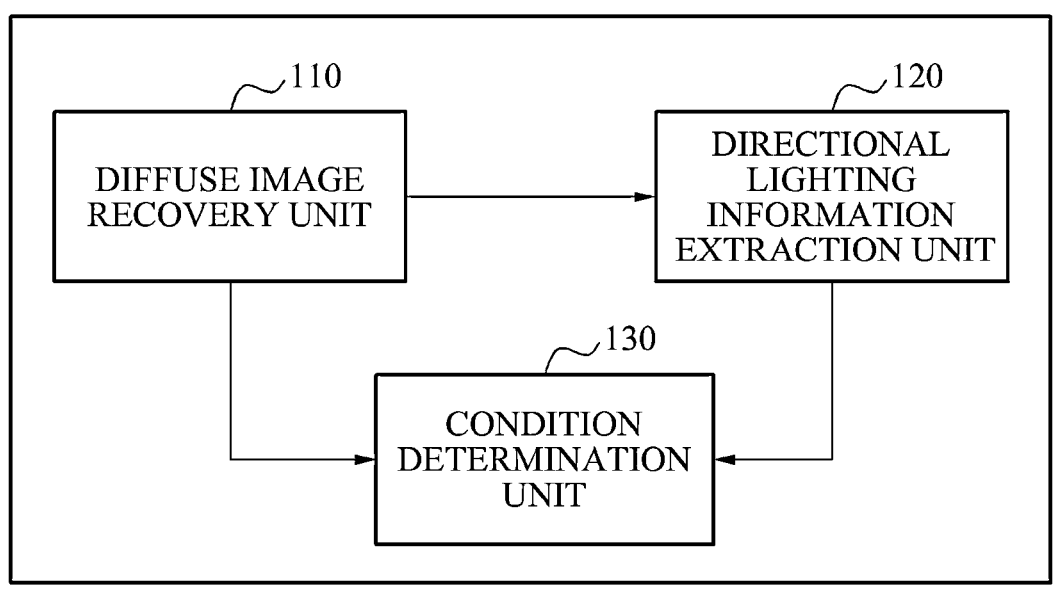
FIG. 2 is a block diagram illustrating a lighting processor according to other example embodiments.

FIG. 2 is a block diagram illustrating a lighting processor 100b according to other example embodiments.

Referring to FIG. 2, the lighting processor 100b may include a diffuse image recovery unit 110, a directional lighting information extraction unit 120, and a lighting condition determination unit 130.

The diffuse image recovery unit 110 may extract diffuse lighting information applied to a real object, based on a colored image and a depth image of the real object, and may recover a diffuse image with respect to the real object based on the extracted diffuse lighting information. The diffuse lighting information may be stored in a form of a texture.

The directional lighting information extraction unit 120 may extract directional lighting information from an error image between the colored image and the diffuse image recovered by the diffuse image recovery unit 110.

The lighting condition determination unit 130 may determine a lighting condition applied to a real object based on the extracted diffuse lighting information, the extracted directional lighting information, and a colored image input.

Figure 3:
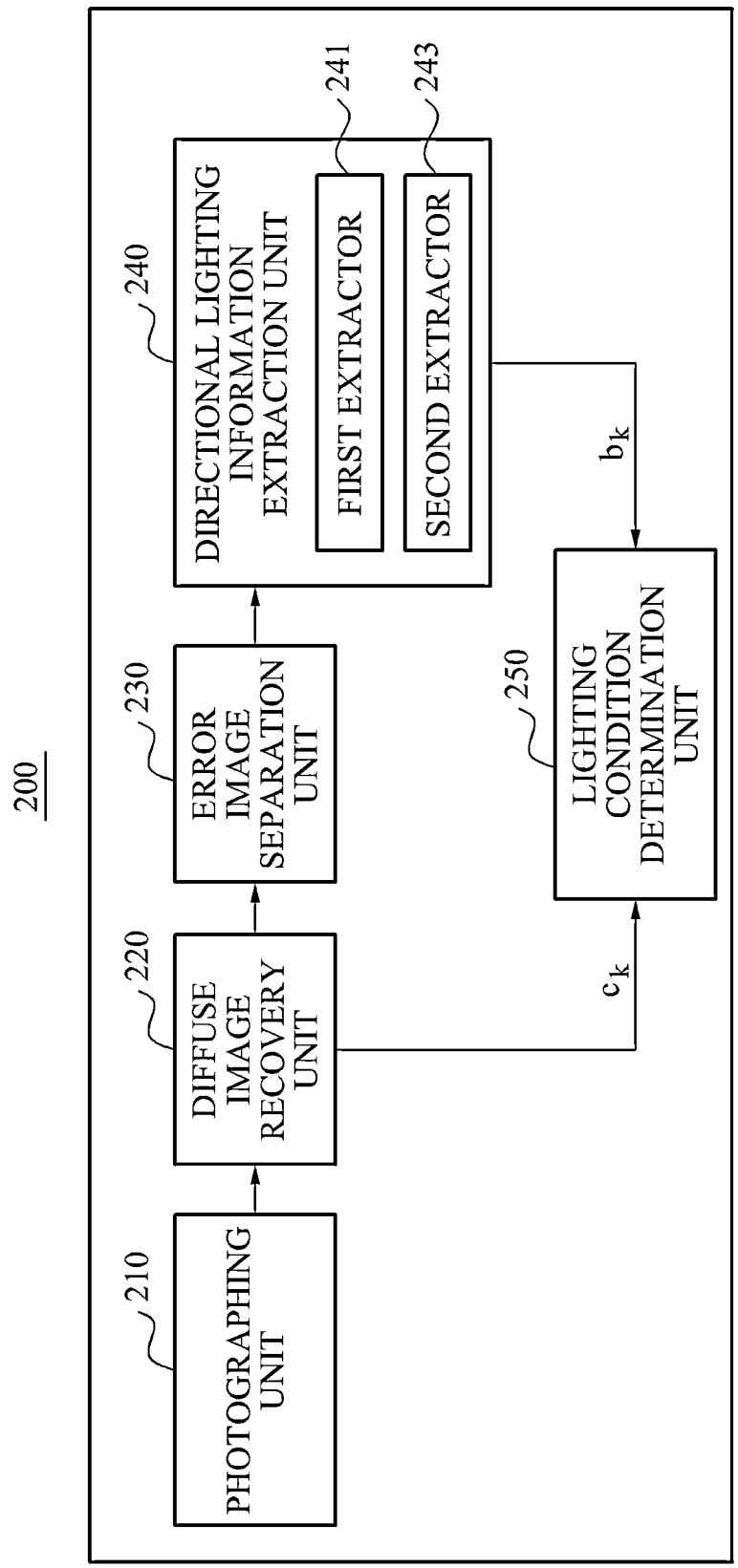
FIG. 3 is a block diagram illustrating a lighting processor to achieve a lighting condition applied to a real object according to example embodiments.

FIG. 3 is a block diagram illustrating a lighting processor 200 to achieve a lighting condition applied to a real object according to example embodiments.

Referring to FIG. 3, the lighting processor 200 may include a photographing unit 210, a diffuse image recovery unit 220, an error image separation unit 230, a directional lighting information extraction unit 240, and a lighting condition determination unit 250.

The photographing unit 210 may photograph a real object in a predetermined lighting environment, and may output a colored image and a depth image. The photographing unit 210 may include a color camera for the colored image and a depth camera for the depth image, or may include a camera integrating the color camera and the depth camera. The photographing unit 210 may also obtain a depth image using a stereo camera or a multi-view camera, and output the obtained depth image and a colored image.

Figure 4:
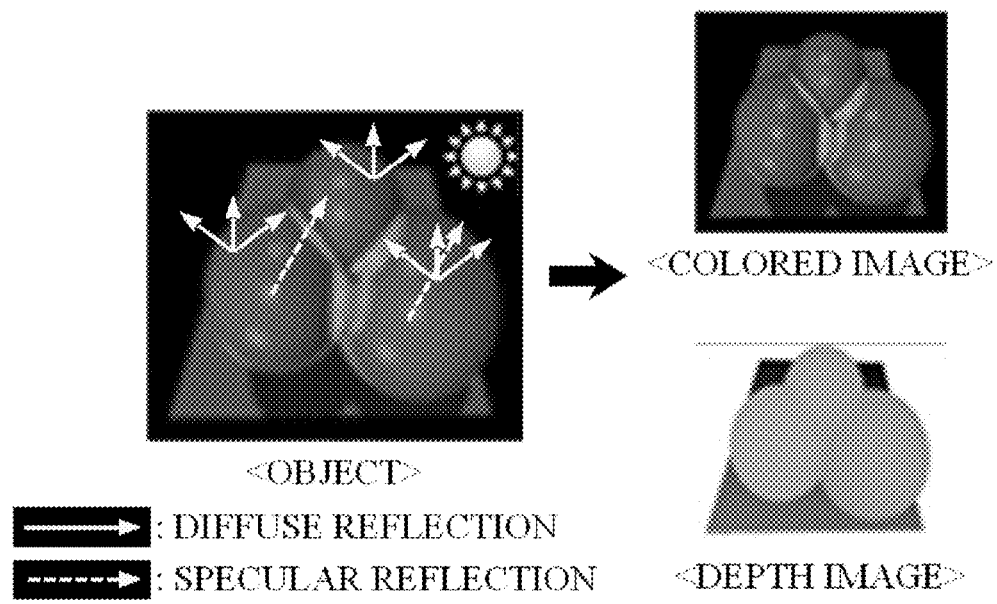
FIG. 4 illustrates an example of a colored image and a depth image that are output from a photographing unit and are used as input images.

FIG. 4 illustrates an example of a colored image and a depth image that are output from the photographing unit 210 and are used as input images. Referring to FIG. 4, a diffuse reflection and a specular reflection may occur from a real object due to a lighting environment.

The diffuse image recovery unit 220 may extract diffuse lighting information applied to a real object, based on a colored image and a depth image of the real object, and may recover a diffuse image with respect to the real object, based on the extracted diffuse lighting information. The diffuse image recovery unit 220 may use a depth image-based low order basis function model to extract the diffuse lighting information.

Figure 5:
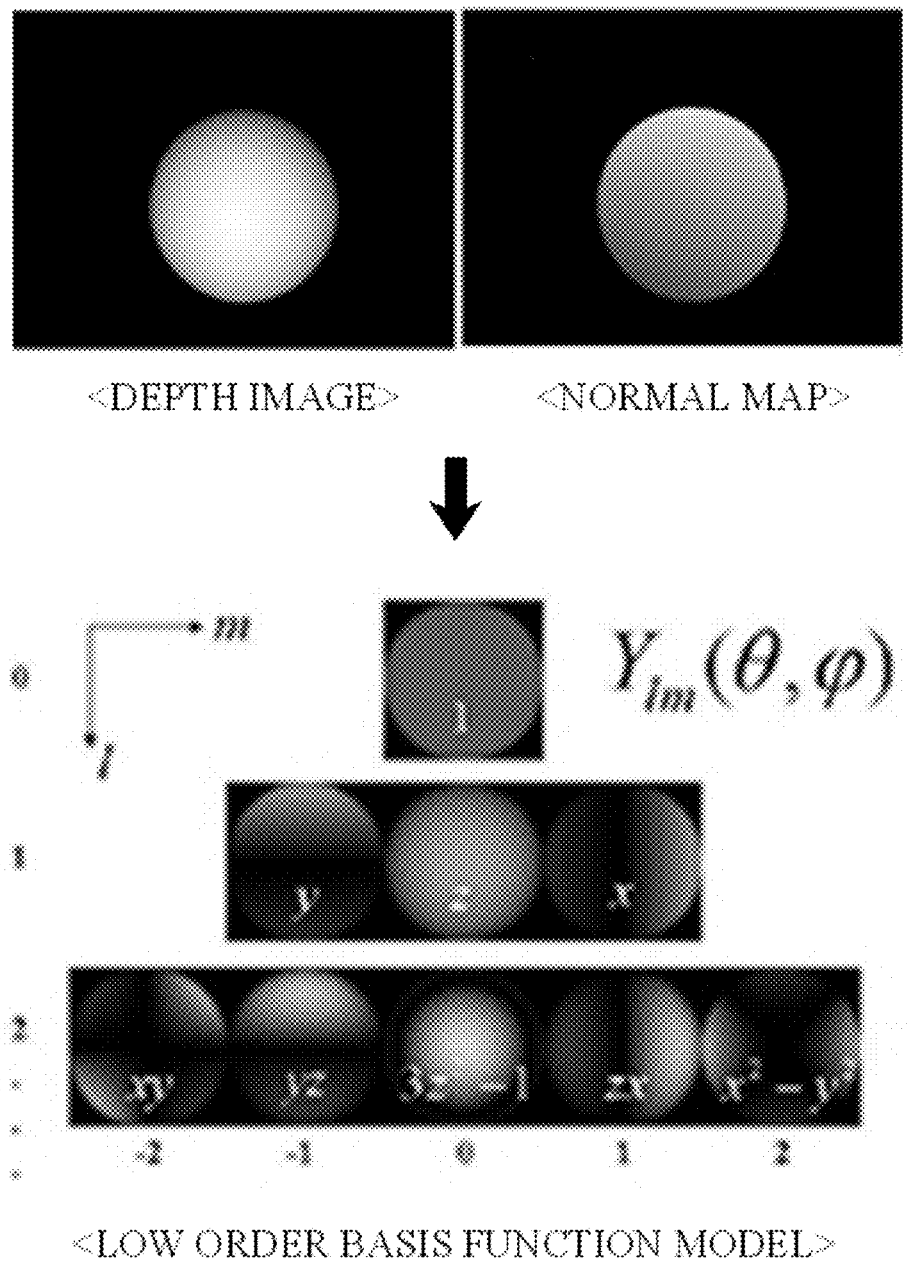
FIG. 5 illustrates a depth image and a low order basis function modeling scheme based on a normal map of the depth image.

FIG. 5 illustrates a depth image and a low order basis function modeling scheme based on a normal map of the depth image.

When the low order basis function model of FIG. 5 is used, a convex Lambertain object may accurately recover a large amount of pixel values, for example, greater than 99%, based on nine low order basis functions. When the low order basis function model is used, the diffuse image recovery unit 220 may generate a low order basis function model appropriate for objects in different shapes, respectively. Therefore, the diffuse image recovery unit 220 may define and express a diffuse reflection occurring in the object when the low order basis function model of FIG. 5 is used, based on Lambertian law. According to 'Lambertian law', the "diffuse reflection is proportional to an inner product between a light vector l and a normal vector n, that is, an orientation of a surface of an object".

Figure 6:
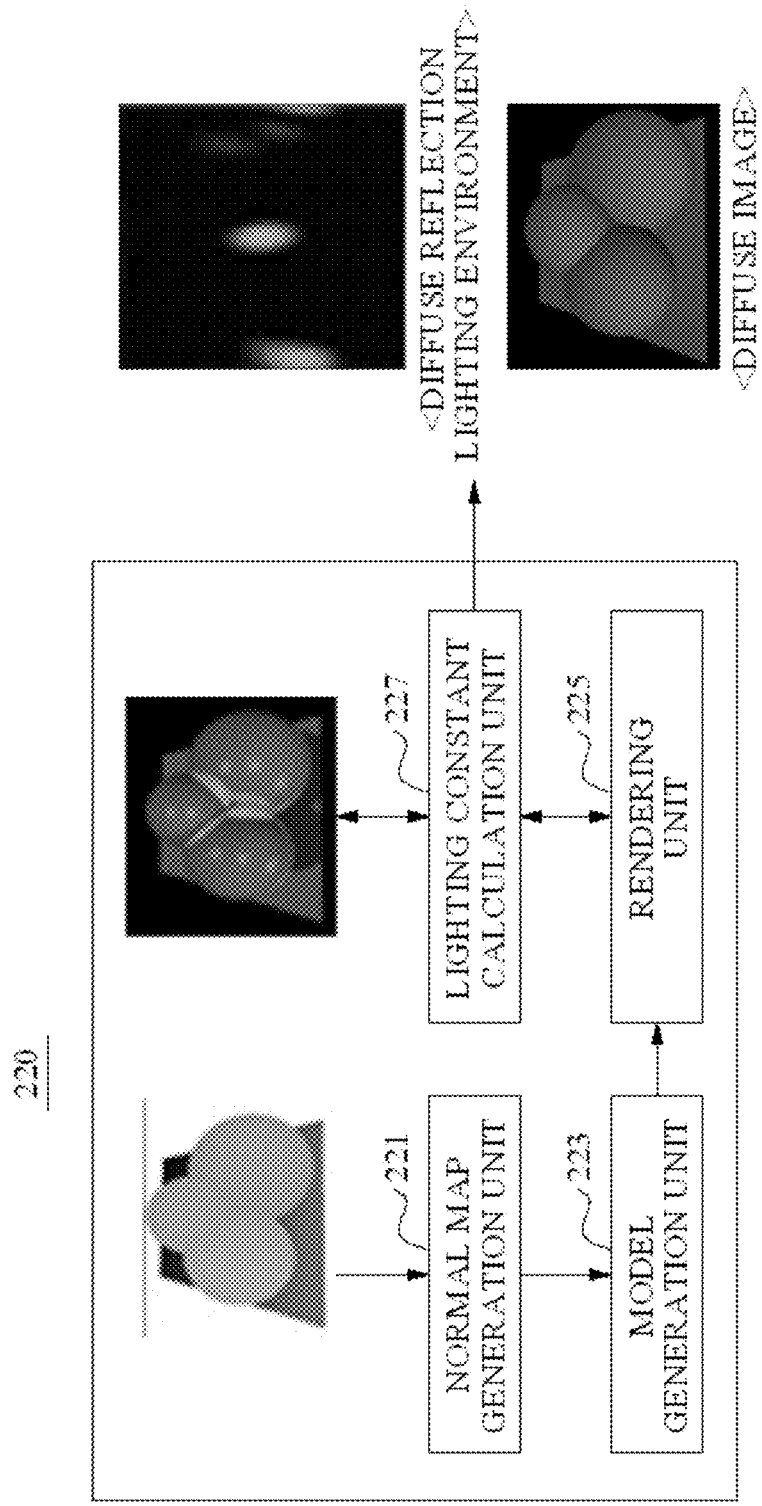
FIG. 6 is a block diagram illustrating a diffuse image recovery unit of FIG. 3.

FIG. 6 is a block diagram illustrating a diffuse image recovery unit 220 of FIG. 3.

Referring to FIG. 6, the diffuse image recovery unit 220 may include a normal map generation unit 221, a model generation unit 223, a rendering unit 225, and a lighting constant calculation unit 227.

The normal map generation unit 221 may generate a normal map of a depth image from a depth image input. A normal map may be normal vectors with respect to to an object, expressed as a texture.

The model generation unit 223 may generate a low order basis function of a depth image from the generated normal map. For example, the spherical harmonics basis function (SHBF) model of FIG. 3 may be used as the low order basis function model.

The rendering unit 225 may perform rendering of the low order basis function model generated from the depth image.

The lighting constant calculation unit 227 may apply the rendered low order basis function model to a colored image, and may calculate at least one diffuse lighting constant that most realistically regenerates the colored image. The lighting constant calculation unit 227 may calculate the at least one diffuse lighting constant based on an optimizing process. The lighting constant calculation unit 227 may apply the low order basis function model to the colored image, and may perform the optimizing process that generates a temporary colored image by changing a diffuse lighting constant and thus, may calculate the at least one diffuse lighting constant. The optimizing process that generates the temporary colored image may be expressed by Equation 1.

$$I_{diffuse} = \sum_{k}(c_k \times D_k(\text{depth}))$$ [Equation 1]

The lighting constant calculation unit 227 may obtain at least one $c_k$ that enables a result of $$\left\| I - \sum_{k} C_k D_k(\text{depth}) \right\|^2$$

to be a minimal value. In Equation 1, I denotes a colored image input. For example, nine diffuse lighting constants, that is, $c_1$ to $c_9$, may be calculated, and a number of diffuse lighting constants may not be limited thereto. In Equation 1, $I_{diffuse}$ denotes a vector indicating an image, and each element of the vector denotes a color value of pixels constituting the image. $c_k$ denotes the diffuse lighting constant, k denotes an index of a lighting constant, and $D_k$ (depth) denotes a rendered low order basis function model.

Diffuse lighting information may be a combination of at least one diffuse lighting constant. Accordingly, the lighting calculation unit 227 may recover a diffuse to image with respect to a real object, based on the diffuse lighting information that is the combination of the at least one diffuse lighting constant. The recovered diffuse image may be a combination of the diffuse lighting information that is the combination of the at least one diffuse lighting constant and the low order basis function model.

Figure 7:
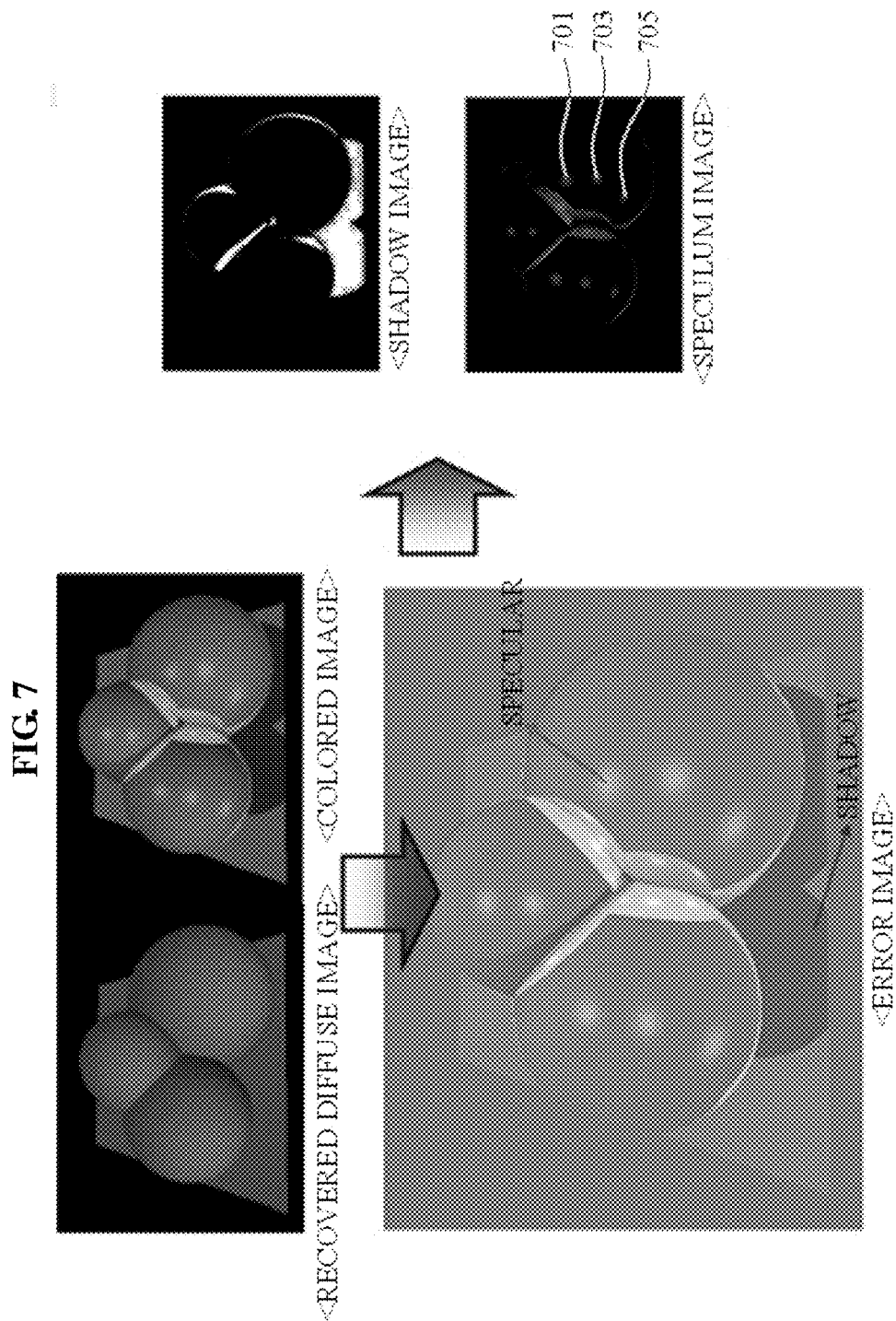
FIG. 7 illustrates an example of a process performed by an error image separation unit of FIG. 3.

FIG. 7 illustrates an example of a process performed by an error image separation unit 230 of FIG. 3.

Referring to FIGS. 3 and 7, the error image separation unit 230 may compare an illuminance of the diffuse image recovered from the diffuse image recovery unit 220 and an illuminance of an original image to obtain an error image displaying an intensity error. The original image may be a colored image output from the photographing unit 210. The error image separation unit 230 may calculate a difference between the recovered diffuse image and the colored image, and may combine the difference to obtain the error image. The difference may be a difference in an intensity of pixels disposed at the same position.

The error image separation unit 230 may analyze the error image to separate the error image into a speculum image and a shadow image. The error image separation unit 230 may apply a predetermined reference value to the error image, to separate the error image into the speculum image and the shadow image. The error image separation unit 230 may separate the error image into the speculum image having pixels of a higher illuminance than the predetermined reference value and the shadow image having pixels of a lower illuminance than the predetermined reference value. The error image separation unit 230 may apply the reference value to a histogram indicating a distribution of each of the pixels of the error image to separate the error image.

Referring to FIG. 3, the directional lighting information extraction unit 240 may extract directional lighting information from the error image between the colored image and the diffuse image recovered by the diffuse image recovery unit 220. The directional lighting information extraction unit 240 may obtain the directional lighting information based on the speculum image and the shadow image separated from the error image.

The directional lighting information extraction unit 240 may include a first extractor 241 that extracts first directional lighting information from the speculum image, and a second extractor 243 that extracts second directional lighting information from the shadow image.

The first extractor 241 may perform reverse-tracing of a direction of a lighting applied to a real object based on a normal vector of a brightest point of the speculum image and a position of the photographing unit 210 that photographs the real object, and may extract the first directional lighting information based on the reverse-traced direction of the lighting.

Figure 8:
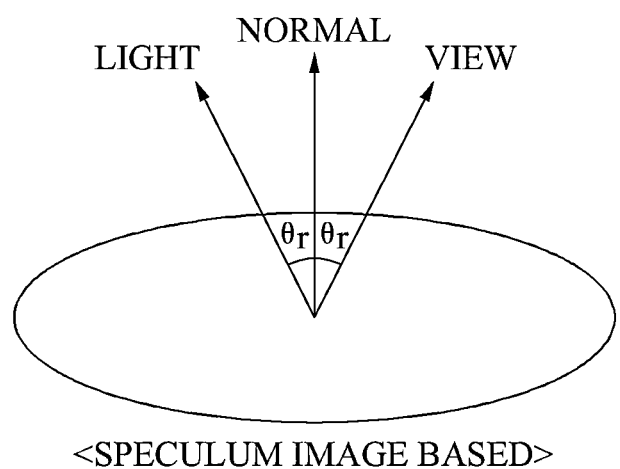
FIG. 8 illustrates an example of a method for extracting first directional lighting information based on a speculum image.

FIG. 8 illustrates an example of a method for extracting first directional lighting information based on a speculum image.

Referring to FIG. 8, the first extractor 241 may detect a brightest point in each local area of the speculum image. The local area may refer to an ellipse or a cluster that is formed to be relatively bright in the speculum image. As an example, the local area may be portions 701, 703, and 705 shown in white circles in the speculum image of FIG. 7. The first extractor 241 may detect the local area based on a Gaussian mean fitting scheme. The first extractor 241 may perform reverse-tracing of a position of a lighting applied to a real object based on a normal vector of a brightest point for each local area and a position of the photographing unit 210. The position of the reversed-traced lighting may be a direction of a lighting applied to the real object.

The first extractor 241 may determine a view vector from the position of the photographing unit 210, and may determine the normal vector of the brightest point for each local area. Accordingly, in a case of the speculum image, the first extractor 241 may perform reverse-tracing of the direction of the lighting based on a principle that an incident angle $\theta_r$ and a reflection angle $\theta_r$ of light are the same based on the normal vector. The first extractor 241 may use one of various specular reflection models, for example, a Phong model, a Blinn-Phong model, a Cook-Torrance (Torrance-Sparrow) model, and the like, to perform reverse-tracing of the direction of the lighting.

The second extractor 243 may generate shadow rays that induce a shadow for each pixel constituting the shadow image, and may extract, as the second directional lighting information, a direction corresponding to a shadow ray having a highest distribution among the generated shadow rays.

Figure 9:
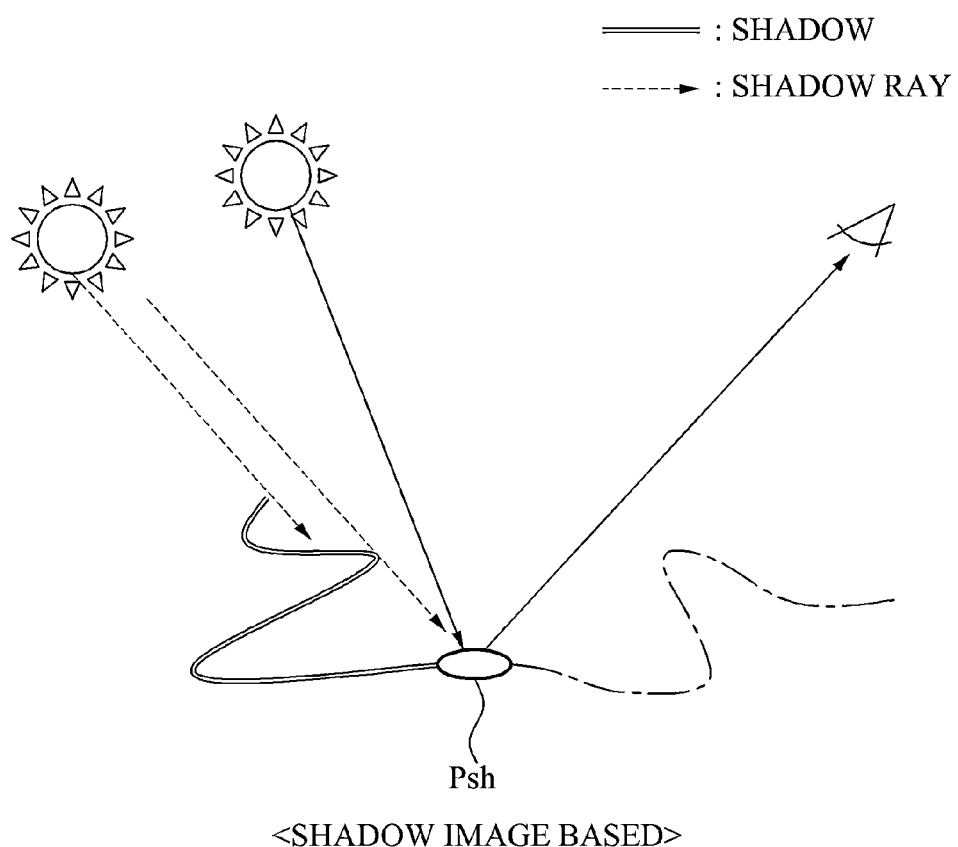
FIGS. 9 and 10 illustrate an example of a method for extracting second directional lighting information based on a shadow image.
Figure 10:
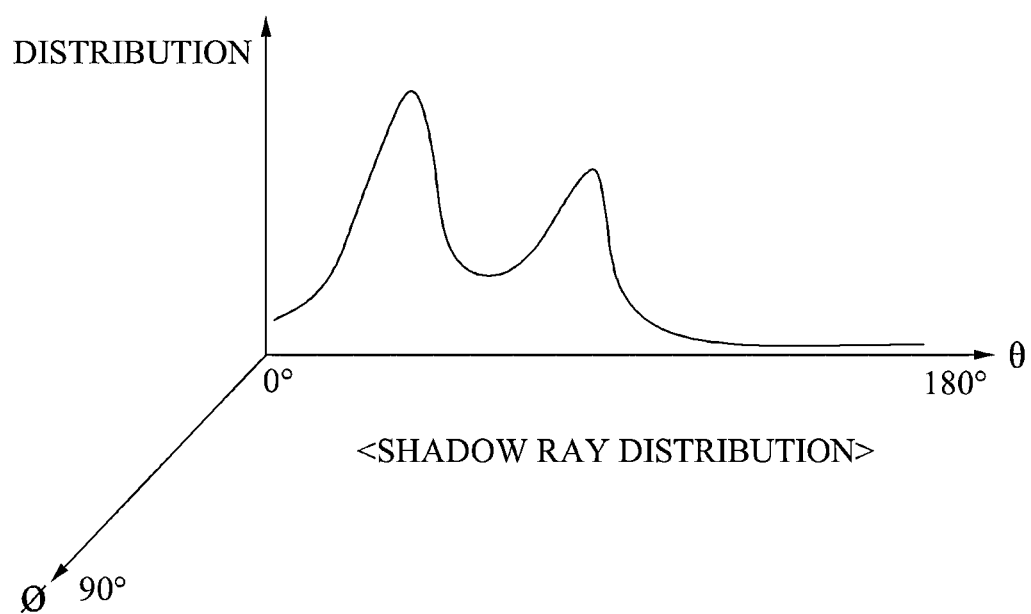

FIGS. 9 and 10 illustrate an example of a method for extracting second directional lighting information based on a shadow image.

Referring to FIG. 9, a double line may be pixels constituting the shadow image, and a dotted lined arrow may be a direction of a lighting that induces a shadow in a shadow pixel. The double line and the dotted lined arrow may be referred to as a shadow ray. The second extractor 243 may generate the shadow ray that induces a shadow for each pixel, for example, $p_{sh}$, constituting the shadow image by changing a predetermined direction of light. The second extractor 243 may generate the shadow ray based on a uniform scheme, a random sampling scheme, and the like. The second extractor 243 may accumulate directions of all shadow rays generated, with respect to all shadow pixels as shown in FIG. 10 to obtain a distribution of the shadow rays. According to example embodiments, a shadow ray may be represented as a horizontal angle $\theta$ in a range of 0 to 180 degrees and a vertical angle $\Phi$ in a range of 0 to 90 degrees from a point of photographing to a position of a lighting when it is assumed that a virtual space in a form of a hemisphere is centered around the point of photographing of an image, and the lighting is situated on a surface of the hemisphere. The second extractor 243 may infer that a direction corresponding to an angle having a highest distribution may be included in the directional lighting information. Referring to FIG. 10, the angles $\theta$ and $\Phi$ corresponding to two peaks, that is, a direction of a lighting, may be included in the directional lighting information.

According to example embodiments, when calculating an angle of a shadow ray having a highest distribution, the second extractor 243 may apply a distribution to a predetermined successive function, for example, a Gaussian mixture function, a polynomial function, and the like, to accurately determine a peak of the distribution, and may extract a shadow ray unselected by sampling as the directional lighting information. The second extractor 243 may combine at least one specular reflection lighting to generate the directional lighting information.

The lighting condition determination unit 250 may determine an illuminance of a lighting environment applied to an object, based on extracted diffuse lighting information, the extracted directional lighting information, and a colored image input. For example, the extracted diffuse lighting information may be a diffuse lighting constant, and the extracted directional lighting information may be a direction value of a lighting. The lighting condition determination unit 250 may determine an illuminance to of the lighting based on Equation 2.

$$[\hat{s}_1, \ldots, \hat{s}_S] = \underset{s_1, \ldots, s_S}{\mathrm{argmin}} \left\| I - \sum_{k=1}^{L} f_D(c_k, \mathrm{depth}) - \sum_{k=1}^{S} f_S(b_k, s_k, \mathrm{depth}, v) \right\|^2 \quad [\text{Equation 2}]$$

In Equation 2, $s_k$ denotes an illuminance of a lighting environment, S denotes a total number of lightings, I denotes the colored image input from the photographing unit 210, and L denotes a total number of diffuse lighting constants constituting the diffuse lighting information. Also, $f_D$, denotes a model expressing a diffuse reflection, $f_S$ denotes a model expressing a specular reflection, $c_k$ denotes a diffuse lighting constant, $b_k$ denotes the direction of the lighting constituting the directional lighting information, depth denotes a depth value of a depth image, and v denotes a view point.

Referring to Equation 2, the lighting condition determination unit 250 may obtain an illuminance of the lighting environment by calculating parameters that minimize $$\left\| I - \sum_{k=1}^{L} f_D(c_k, \mathrm{depth}) - \sum_{k=1}^{S} f_S(b_k, s_k, \mathrm{depth}, v) \right\|^2.$$

The lighting condition determination unit 250 may use the directional lighting information as a direction of a lighting. The directional lighting information may include a plurality of lighting direction information.

Figure 11:
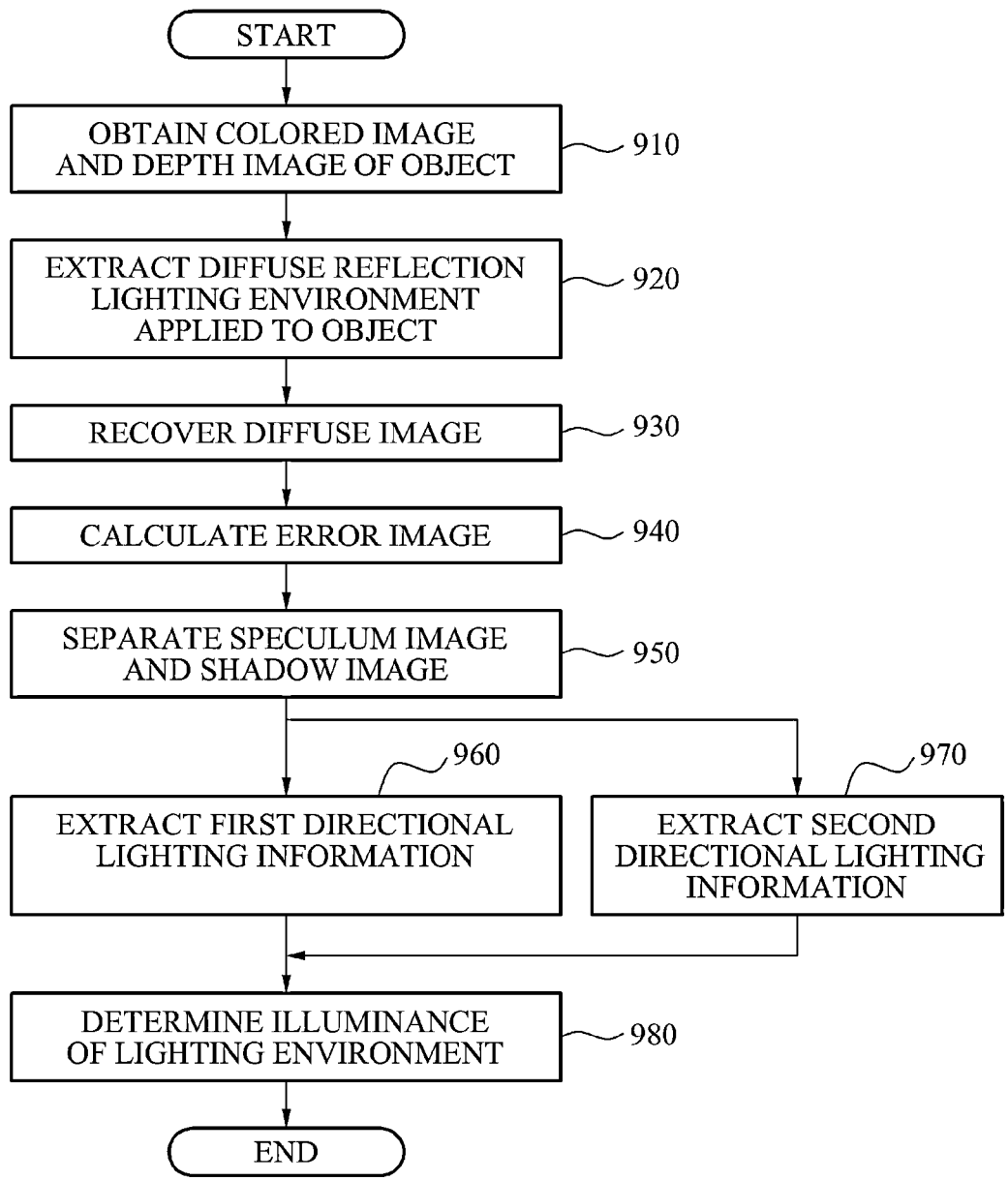
FIG. 11 is a flowchart illustrating a method for processing a lighting according to example embodiments.

FIG. 11 is a flowchart illustrating a method for processing a lighting according to example embodiments.

Referring to FIG. 11, the method for processing the lighting may be conducted by a controller (not shown) or at least one processor (not shown) that may control or process each operation in the lighting processors 100a, 100b, and 200 described with reference to FIGS. 1, 2, and 3.

In operation 910, the lighting processor may obtain a colored image and a depth image of a real object based on a camera.

In operation 920, the lighting processor may extract diffuse lighting information applied to the real object, based on the obtained colored image and the obtained depth image. In operation 920, the diffuse lighting information may be extracted using a depth image-based low order basis function model. This will be described with reference to FIG. 10.

In operation 930, the lighting processor may recover a diffuse image with respect to the real object, based on the extracted diffuse lighting information.

In operation 940, the lighting processor may compare an illuminance of the recovered diffuse image and an illuminance of an original image, that is, the obtained colored image, to calculate an error image.

In operation 950, the lighting processor may analyze the calculated error image to separate the error image into a speculum image and a shadow image. The speculum image may be an image including pixels having a higher illuminance than a predetermined reference value, in the error image. The shadow image may be an image including pixels having a lower illuminance than the predetermined reference value, in the error image.

In operation 960, the lighting processor may extract first directional lighting information from the separated speculum image. For example, the lighting processor may perform reverse-tracing of a direction of a lighting applied to a real object, based on a normal vector of a brightest point for each local area of the speculum image and a position of a camera that photographs the real object, and may extract the direction of the lighting that is reverse-traced as the first directional lighting information.

In operation 970, the lighting processor may extract second directional lighting information from the separated shadow image. For example, the lighting processor may generate shadow rays that induce a shadow for each pixel constituting the shade image, and may extract, as the second directional lighting information, a direction corresponding to a shadow ray having a highest distribution from among the generated shadow rays.

In operation 980, the lighting processor may apply, to Equation 2, the extracted diffuse lighting information, the extracted first directional lighting information, the extracted second directional lighting information, and the colored image obtained, to determine an illuminance of a lighting environment applied to the real object.

Figure 12:
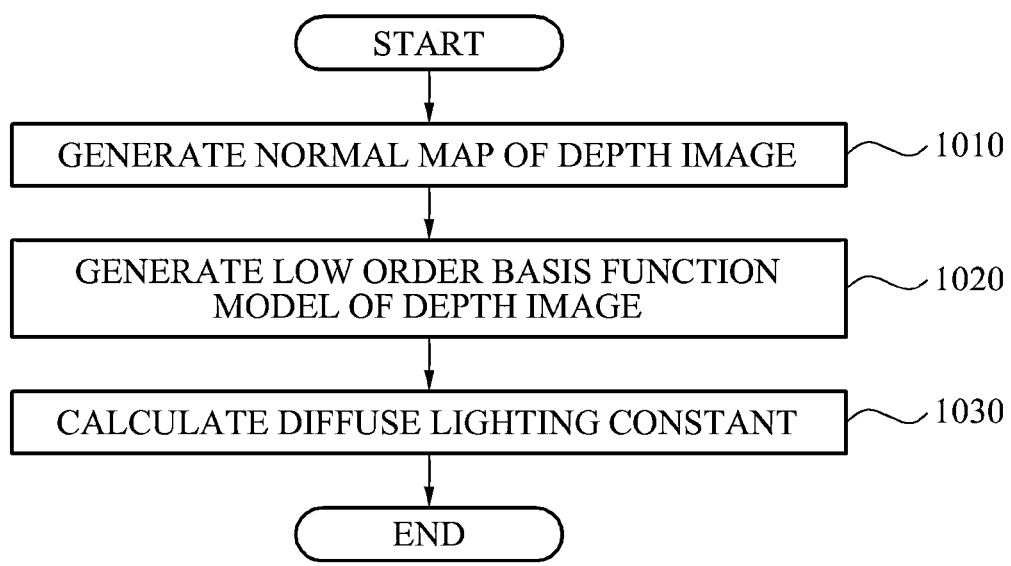
FIG. 12 is a flowchart illustrating operation 920 of FIG. 11.

FIG. 12 is a flowchart illustrating operation 920 of FIG. 11.

In operation 1010, a lighting processor may generate a normal map of a depth image from the depth image obtained in operation 910.

In operation 1020, the lighting processor may generate a low order basis function model of the depth image from the generated normal map.

In operation 1030, the lighting processor may perform rendering of the low order basis function model obtained from the depth image, apply the rendered low order basis function model to a colored image, and obtain at least one diffuse lighting constant that regenerates the colored image most realistically.

Figure 13:
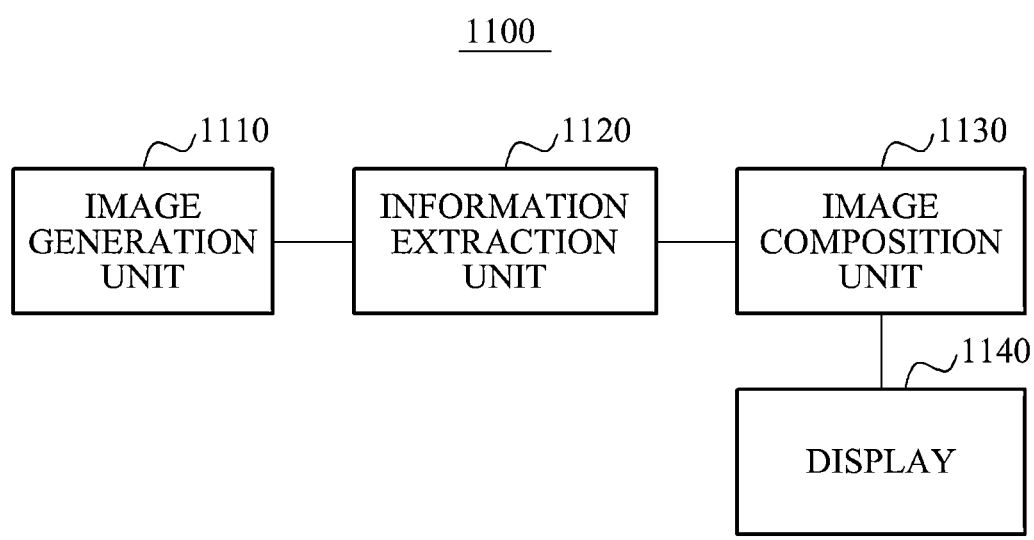
FIG. 13 illustrates a configuration of an image processor including a lighting processor according to example embodiments.

FIG. 13 illustrates a configuration of an image processor including a lighting processor according to example embodiments.

Referring to FIG. 13, the image processor 1100 may include an image generation unit 1110, a lighting information extraction unit 1120, and an image composition unit 1130. The image processor 1100 may further include a display 1140.

The image generation unit 1110 may generate at least one of a speculum image and a shadow image based on a colored image and a depth image. The image generation unit 1110 may perform a function of the error image separation unit 230 of FIG. 2.

The lighting information extraction unit 1120 may extract directional lighting information from at least one of the speculum image and the shadow image. The lighting information extraction unit 1120 may extract diffuse lighting information based on the colored image and the depth image.

According to other example embodiments, the image generation unit 1110 may extract the diffuse lighting information and generate a diffuse image using the extracted diffuse lighting information.

The image composition unit 1130 may generate a lighting condition using at least one of the directional lighting information and the diffuse lighting information, and compose, to the colored image, a virtual object to which the generated lighting condition is applied.

Accordingly, the image processor 1100 may generate the lighting condition from a predetermined scene of an image input, and insert, to the predetermined scene, the virtual object to which the extracted lighting condition is applied. The image processor 1100 may display the predetermined scene to which the virtual object is inserted through the display 1140.

Example embodiments of generating the lighting condition based on only one of the diffuse lighting information and the directional lighting information, and of inserting, to the colored image, a virtual object to which the generated lighting condition is applied. Also, an example embodiment of extracting the directional lighting information based on only one of the speculum image and the shadow image may be possible. To this end, element functions of the aforementioned lighting processor or the image processor may be subject to change.

Example embodiments include computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of computer-readable media include magnetic media such as hard disks, floppy disks, and magnetic tape; optical media such as CD ROM discs; magneto-optical media such as floptical discs; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

The invention claimed is:

1. A lighting processor device, comprising:
a processor; and
a memory storing one or more programs, wherein the one or more programs are configured to be executed by the processor, the one or more programs including instructions for:
extracting, using a colored image and a depth image of a real object, diffuse lighting information applied to the real object;
recovering a diffuse image with respect to the real object, based on the extracted diffuse lighting information; and generating a speculum image based on a calculated difference between the recovered diffuse image and the colored image, and a shadow image based on the recovered diffuse image and the colored image, wherein the speculum image is generated from an error image between the colored image and the diffuse image recovered by the diffuse image recovery unit, and wherein an illuminance of a lighting environment applied to the real object is based on an illuminance of the lighting, a total number of lightings, the colored image, a total number of diffuse lighting constants constituting a diffuse reflection lighting environment, a model expressing a diffuse reflection, a model expressing a specular reflection, a diffuse lighting constant, a direction of light of the lighting constituting a specular reflection lighting environment, a depth value of the depth image, and a view point.

2. The lighting processor device of claim 1, wherein the one or more programs further including instructions for:
extracting directional lighting information from at least one of the speculum image and the shadow image.

3. The lighting processor device of claim 2, wherein the one or more programs further including instructions for:
determining the illuminance of the lighting environment applied to the real object, based on the extracted diffuse lighting information, the extracted directional lighting information, and the colored image.

4. The lighting processor device of claim 1, wherein the one or more programs further including instructions for:
generating a normal map of the depth image;
generating a low order basis function model of the depth image based on the generated normal map; and
applying the low order basis function model to the colored image to calculate at least one of the diffuse lighting constants that regenerates the colored image most realistically.

5. The lighting processor device of claim 4, wherein the diffuse lighting information is a combination of the at least one diffuse lighting constant.

6. The lighting processor device of claim 1, wherein the one or more programs further including instructions for:
comparing an illuminance of the diffuse image and an illuminance of the colored image to generate the error image displaying an intensity error, and to separate the error image into the speculum image and the shadow image.

7. The lighting processor device of claim 6, wherein the speculum image comprises a pixel having a higher illuminance than a predetermined reference value of the error image, and the shadow image comprises a pixel having a lower illuminance than the predetermined reference value of the error image.

8. The lighting processor device of claim 2, wherein the one or more programs further including instructions for:
extracting a direction of a lighting applied to the real object as the directional lighting information, based on a normal vector of a brightest point for each local area of the speculum image.

9. The lighting processor device of claim 2, wherein the one or more programs further including instructions for:
extracting a direction of a lighting that generates a shadow for pixels constituting the shadow image, and extracts a direction indicating a peak value in a distribution of the extracted direction of the lighting as the directional lighting information.

10. The lighting processor device of claim 3, wherein the one or more programs further including instructions for:
determining the illuminance of the lighting based on the following equation:

$$[\hat{s}_1, \ldots, \hat{s}_S] = \underset{s_1,\ldots,s_S}{\operatorname{argmin}} \left\| I - \sum_{k=1}^{L} f_D(c_k, \text{depth}) - \sum_{k=1}^{S} f_S(b_k, s_k, \text{depth}, v) \right\|^2,$$

wherein $s_k$ denotes the illuminance of the lighting, S denotes the total number of the lightings, I denotes the colored image, L denotes the total number of diffuse lighting constants constituting the diffuse reflection lighting environment, $f_D$ denotes the model expressing the diffuse reflection, $f_S$ denotes the model expressing the specular reflection, $c_k$ denotes the diffuse lighting constant, $b_k$ denotes the direction of the light of the lighting constituting the specular reflection lighting environment, depth denotes the depth value of the depth image, and v denotes the view point.

11. A lighting processing method, the method comprising:
extracting, based on a colored image and a depth image of a real object, diffuse lighting information applied to the real object, and recovering, based on the extracted diffuse lighting information, a diffuse image with respect to the real object; and
generating a speculum image based on a calculated difference between the recovered diffuse image and the colored image, and a shadow image based on the recovered diffuse image and the colored image,
wherein the speculum image is generated from an error image between the colored image and the diffuse image recovered by a diffuse image recovery unit, and wherein an illuminance of a lighting environment applied to the real object is based on an illuminance of the lighting, a total number of lightings, the colored image, a total number of diffuse lighting constants constituting a diffuse reflection lighting environment, a model expressing a diffuse reflection, a model expressing a specular reflection, a diffuse lighting constant, a direction of light of the lighting constituting a specular reflection lighting environment, a depth value of the depth image, and a view point.

12. The method of claim 11, further comprising:
determining the illuminance of a lighting environment applied to the real object, based on the extracted diffuse lighting information, the extracted directional lighting information, and the colored image.

13. The method of claim 11, wherein the colored image and the depth image are images of the real object applied to a three-dimensional (3D) image.

14. The method of claim 11, wherein the recovering comprises:
generating a normal map of the depth image;
generating a low order basis function model of the depth image based on the generated normal map; and
calculating at least one of the diffuse lighting constants that regenerates the colored image most realistically by applying the low order basis function model to the colored image.

15. The method of claim 14, wherein the diffuse lighting information is a combination of the at least one diffuse lighting constant.

16. The method of claim 11, further comprising:
generating the error image displaying an intensity error by comparing an illuminance of the diffuse image and an illuminance of the colored image, and separating the error image into the speculum image and the shadow image.

17. The method of claim 16, wherein the speculum image comprises a pixel having a higher illuminance than a predetermined reference value of the error image, and the shadow image comprises a pixel having a lower illuminance than the predetermined reference value of the error image.

18. The method of claim 16, further comprising:
extracting directional lighting information based on at least one of the speculum image and the shadow image.

19. The method of claim 18, further comprising:
determining an illuminance of a lighting environment applied to the real object, based on the extracted diffuse lighting information, the extracted directional lighting information, and the colored image.

20. The method of claim 18, wherein the extracting of the directional lighting information comprises:
extracting the direction of a lighting applied to the real object as the directional lighting information, based on a normal vector of a brightest point for each local area of the speculum image and a position of a camera used for capturing the real object.

21. The method of claim 12, wherein the determining of the illuminance determines the illuminance of the lighting based on the following equation:

$$[\hat{s}_1, \ldots, \hat{s}_S] = \underset{s_1, \ldots, s_S}{\operatorname{argmin}} \left\| I - \sum_{k=1}^{L} f_D(c_k, \text{depth}) - \sum_{k=1}^{S} f_S(b_k, s_k, \text{depth}, v) \right\|^2,$$

wherein $s_k$ denotes the illuminance of the lighting, S denotes the total number of lightings, I denotes the colored image, L denotes the total number of diffuse reflection lighting constants constituting the diffuse reflection lighting environment, $f_D$ denotes the model expressing the diffuse reflection, $f_S$ denotes the model expressing the specular reflection, $c_k$ denotes the diffuse lighting constant, $b_k$ denotes the direction of the light of the lighting of the specular reflection lighting environment, depth denotes the depth value of the depth image, and v denotes the view point.

22. An image processor device, comprising:
a processor; and
a memory storing one or more programs, wherein the one or more programs are configured to be executed by the processor, the one or more programs including instructions for:
recovering a diffuse image with respect to a real object, based on an extracted diffuse lighting information;
generating a speculum image based on a calculated difference between the recovered diffuse image and a colored image, and a shadow image based on the colored image and a depth image,
wherein the speculum image is generated from an error image between the colored image and the diffuse image recovered by the diffuse image recovery unit; and
extracting directional lighting information from at least one of the generated speculum image and the generated shadow image, and wherein an illuminance of a lighting environment applied to the real object is based on an illuminance of the lighting, a total number of lightings, the colored image, a total number of diffuse lighting constants constituting a diffuse reflection lighting environment, a model expressing a diffuse reflection, a model expressing a specular reflection, a diffuse lighting constant, a direction of light of the lighting constituting a specular reflection lighting environment, a depth value of the depth image, and a view point.

23. The image processor device of claim 22, wherein the one or more programs further including instructions for:
composing the colored image and a virtual object to which a lighting condition based on the extracted directional lighting information is applied.

24. An image processor device, comprising:
a processor; and
a memory storing one or more programs, wherein the one or more programs are configured to be executed by the processor, the one or more programs including instructions for:
recovering a diffuse image with respect to a real object, based on an extracted diffuse lighting information;
extracting directional lighting information applied to a speculum image, based on a colored image and a depth image,
wherein the speculum image is based on a calculated difference between the recovered diffuse image and the colored image, and
wherein the speculum image is generated from an error image between the colored image and the diffuse image recovered by the diffuse image recovery unit; and
composing the colored image and a virtual object to which a lighting condition is applied based on the extracted directional lighting information, and wherein an illuminance of lighting environment applied to the real object is based on an illuminance of the lighting, a total number of lightings, the colored image, a total number of diffuse lighting constants constituting a diffuse reflection lighting environment, a model expressing a diffuse reflection, a model expressing a specular reflection, a diffuse lighting constant, a direction of light of the lighting constituting a specular reflection lighting environment, a depth value of the depth image, and a view point.

* * * * *